United States Patent
Itelman (10) Patent No.: US 8,873,936 B1
(45) Date of Patent: Oct. 28, 2014

(54) SYSTEM AND METHOD FOR GENERATING A SYNCHRONIZED AUDIOVISUAL MIX

(71) Applicant: Ron Itelman, San Francisco, CA (US)

(72) Inventor: Ron Itelman, San Francisco, CA (US)

(73) Assignee: JAMR Labs, Inc., San Francisco, CA (US)

(*) Notice: Subject to any disclaimer, the term of this patent is extended or adjusted under 35 U.S.C. 154(b) by 220 days.

(21) Appl. No.: 13/686,822

(22) Filed: Nov. 27, 2012

(51) Int. Cl.
- G11B 27/00 (2006.01)
- H04N 9/79 (2006.01)
- G11B 27/031 (2006.01)

(52) U.S. Cl.
CPC ............... H04N 9/79 (2013.01); G11B 27/031 (2013.01)
USPC ......................................................... 386/278

(58) Field of Classification Search
CPC ........... H04N 1/00; H04N 5/00; H04N 5/262; G11B 27/034; G11B 27/031; G06Q 50/00
USPC ......................................... 386/200, 241, 278
See application file for complete search history.

(56) References Cited

U.S. PATENT DOCUMENTS

| 7,518,051 B2 | 4/2009 | Redmann ........................ 84/601 |
| 7,984,385 B2* | 7/2011 | Ubillos ......................... 715/793 |
| 2009/0113022 A1 | 4/2009 | Quoc et al. .................... 709/218 |
| 2009/0172200 A1 | 7/2009 | Morrison et al. ............. 709/248 |
| 2011/0103772 A1* | 5/2011 | Suzuki .......................... 386/285 |
| 2012/0096371 A1 | 4/2012 | D'Anna ........................ 715/756 |
| 2012/0265859 A1 | 10/2012 | Zohar et al. ................... 709/219 |

* cited by examiner

Primary Examiner — Huy T Nguyen
(74) Attorney, Agent, or Firm — Pillsbury Winthrop Shaw Pittman LLP (57) ABSTRACT

A system and method for generating a synchronized mix of a plurality of audiovisual tracks is provided. A new audiovisual track may be recorded simultaneously while one or more other audiovisual tracks are being played to help simulate a live jam session as closely as possible. In a "DJ Mix" mode, a user may manipulate sequencing and/or characteristics related to one or more audiovisual tracks included in a project in real-time while the project (e.g., song) is being played. A synchronized mix of a plurality of audiovisual tracks may be generated based on various attributes associated with the audiovisual tracks. For example, audiovisual tracks that are recorded along with a metronome may be synchronized based on a metronome clock rate selected by a user.

22 Claims, 6 Drawing Sheets

SYSTEM AND METHOD FOR GENERATING A SYNCHRONIZED AUDIOVISUAL MIX

FIELD OF THE INVENTION

The disclosure relates to systems and methods for playing one or more audiovisual tracks, simultaneously recording a new audiovisual track and/or modifications made to the one or more audiovisual tracks in real-time during the play to generate a synchronized audiovisual mix, and/or communicating the mix to a user in real-time.

BACKGROUND OF THE INVENTION

Many musicians gather together in a physical location and have live jam sessions with other musicians. Live jam sessions facilitate collaborations between musicians, help building a community for exchanging talents and ideas with other musicians, and provide opportunities to practice together in preparing for a recording session.

Conventional systems have been developed in an attempt to facilitate music collaborations between remote performers via computer network connections. For example, participants of a jam session who are unable to gather up in a physical location may input data streams of their performance to contribute to the jam session. However, a live jam session cannot be properly held when the data streams to be contributed to the jam session are made at different times.

Thus, what is needed is to be capable of simulating the experience and excitement of live jam sessions between musicians who perform from different remote locations and at different times. What is further needed is to be capable of creating a mix of a plurality of tracks each of which includes both audio and video data such that a user may experience and enjoy full auditory and visual effects of the jam session. These and other problems may exist.

SUMMARY OF THE INVENTION

The disclosure relates to systems and methods for playing one or more audiovisual tracks, simultaneously recording a new audiovisual track and/or modifications made to the one or more audiovisual tracks in real-time during the play to generate a synchronized audiovisual mix, and/or communicating the mix to a user in real-time. An audiovisual track may include a video clip of a musical performance such as a performance of a musical instrument, a vocal performance, video clips of various other types of performances (e.g., dance performances, comedy performances, etc.), and/or video clips of various types of sound.

By simultaneously recording a new audiovisual track while other audiovisual tracks are being played back such that the new audiovisual track can be combined with the other tracks in real-time, it enables a user to simulate the experience and excitement of a live jam session. A user may listen and view how a plurality of audiovisual tracks are combined together to generate a synchronized mix as the user records a musical performance within the mix.

In some embodiments, the system may include a computer that facilitates generating a synchronized audiovisual mix using simultaneous recording and live playback of audiovisual tracks. The computer may include one or more processors configured to perform some or all of a functionality of a plurality of modules. For example, the one or more processors may be configured to execute a project creation module, a track recording module, a synchronization module, a mixer module, a communication module, a user interface module, and/or other modules.

The project creation module may be configured to obtain a project by creating a new project and/or retrieving an existing project from a media library and/or media sharing service. A project may include audiovisual tracks that may be combined together into a mix. For example, a project may be a particular song, and audiovisual tracks of the project may include a video clip of a performer's playing the keyboard, playing the drum, singing the song, etc.

The project creation module may obtain project attributes related to the project such as the name of the project (e.g., song title), the name of the project creator (e.g., artist name), notes, date and time that the project was created and/or modified, metronome properties, project time duration, relative start and end times of audiovisual tracks that are included in the project, pitch (e.g., "C"), key (e.g., "major" or "minor"), and/or one or more identifications of the audiovisual tracks. In addition, the project creation module may be configured to obtain track attributes related to individual audiovisual tracks included in the project such as the name of the track (e.g., "drum," "keyboard," and/or other track titles), the name of the track creator (e.g., performer name), notes, date and time that the track was created, recorded, and/or modified, metronome properties, track time duration, pitch, key, and/or one or more identifications of "DJ Mix" records ("DJ Mix Record IDs").

The project creation module may be configured to add audiovisual tracks to the new project and/or existing project by recording new tracks and/or importing existing tracks from the media library and/or from various media sharing services (e.g., YouTube, Hulu, etc.).

The track recording module may be configured to create a new audiovisual track by recording an audiovisual input from an audiovisual capture device. In some embodiments, the track recording module may be configured to create a new audiovisual track to be added to a project by simultaneously recording the audiovisual input while other existing tracks of the project are being played. In this way, the track recording module may layer a new audiovisual track over other existing audiovisual tracks in real-time. This may allow a user to perform a musical instrument while listening to and watching visual performance of other parts of the song to help simulate a live jam session as closely as possible.

In some embodiments, the track recording module may start recording an audiovisual input from the beginning of an existing track being played back. In other embodiments, the track recording module may add a new track at a certain point in time in the middle of a particular existing track being played back. This technique may be useful, for example, when a user wants to insert a solo part (e.g., guitar solo) in the middle of a song.

The synchronization module may be configured to synchronize a plurality of audiovisual tracks in a project by specifying or otherwise updating one or more track attributes and/or project attributes including metronome properties (as related to a particular audiovisual track and/or the project), pitch, key, project time duration, relative start and end times of audiovisual tracks that are included in the project, and/or one or more identifications of the audiovisual tracks based on tracks being added to and/or deleted from the project.

In some embodiments, the synchronization module may be configured to specify or otherwise update metronome properties including whether a metronome is enabled or disabled for the track, a metronome clock rate (e.g., BPM), and/or the volume and sound of the metronome.

In some embodiments, when recording a new audiovisual track in the project, the synchronization module may be configured to determine whether the metronome is enabled or disabled based on the metronome properties associated with the project before starting to record the new track. Based on this determination, the synchronization module may determine whether to turn on or off the metronome while recording the new track. When it is turned on, a user may hear the metronome at a clock rate (as specified by the metronome properties associated with the project) in the background while recording the new track such that the timing and tempo of the plurality of audiovisual tracks in the project may be synchronized.

In some embodiments, when importing an existing audiovisual track from the media library and/or media sharing services to the project, the synchronization module may be configured to determine whether the metronome clock rate associated with the project is the same as or different from a metronome clock rate associated with the imported track. The metronome clock rate associated with the imported track may be adjusted according to the metronome clock rate associated with the project in order to synchronize the imported track with the rest of audiovisual tracks included in the project.

Whenever an additional track is added to a particular project by recording new tracks and/or importing existing tracks, the synchronization module may be configured to specify or otherwise update relative start and end times of the audiovisual tracks in order to ensure that the tracks can be successfully combined as one synchronized mix. Furthermore, based on the relative start and end times of individual audiovisual tracks included in the project, the synchronization module may be configured to specify or otherwise update the project time duration for that particular project. For example, the synchronization module may compare the relative end times associated with individual tracks included in the project with one another and/or identify the latest end time. In this example, the latest end time may be used to specify or otherwise determine the project time duration for the project.

The mixer module may be configured to activate a "diskjockey (DJ) Mix" mode and/or simultaneously record the changes and/or modifications made to "DJ Mix" settings associated with individual audiovisual tracks in a project while the project (e.g., the entire collection of audiovisual tracks included in the project) is being played back. In other words, while the project is being played back, mixer module 114 may record a user's DJ actions that change and/or modify sequencing and/or characteristics related to one or more audiovisual tracks included in the project.

"DJ Mix" settings may include deleting of a track, looping a part of a track, changing the volume of a track, muting the volume, hiding a track, and/or changing the position of a track on a screen. An individual track may be associated with one or more "DJ Mix" records where each "DJ Mix" record may comprise information related to a particular "DJ Mix" setting. For example, a "DJ Mix" record associated a particular track may include a default value of 7 for the volume. If a user changes the volume for this track via mixer module 114 while the project is being played back, the "DJ Mix" record may be updated to include the new value for the volume and a point in time at which the volume was changed.

The mixer module may be configured to generate a synchronized mix of a plurality of audiovisual tracks included in a project based on the selected options and/or changes for the "DJ Mix" settings that have been simultaneously recorded during the playback of the project.

In some embodiments, the communication module may be configured to communicate a synchronized mix via a user interface such that a user may listen and view the mix being played. In some embodiments, the communication module may enable live playback of the mix while an audiovisual input is being recorded. For example, a user may listen and view the mix being played as the user records a musical performance.

In some embodiments, the user interface module may be configured to generate user interfaces that allow interaction with projects and audiovisual tracks. For example, the user interface module may present various displays for creating projects, recording audiovisual tracks, synchronizing the tracks, and/or mixing the tracks.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
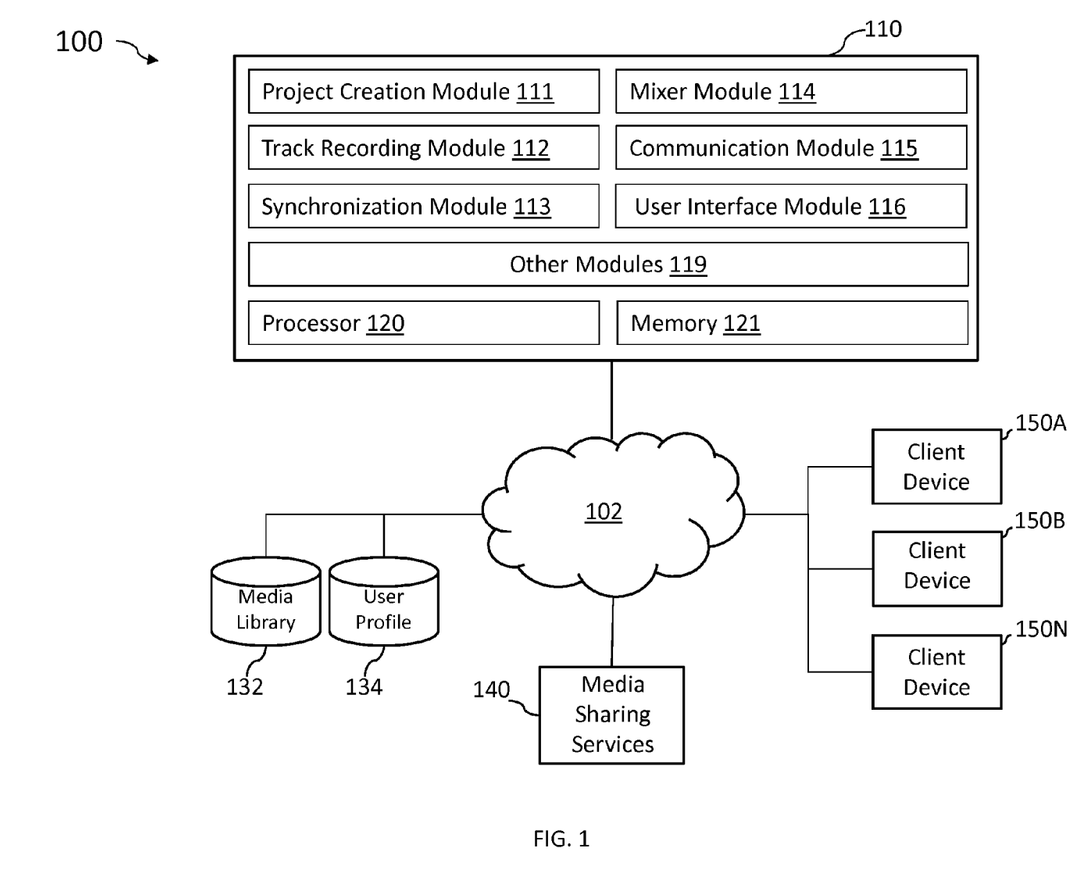
FIG. 1 illustrates a system of generating a synchronized mix of audiovisual tracks, according to an aspect of the invention.

FIG. 1 illustrates a system 100 of generating a synchronized mix of audiovisual tracks, according to an aspect of the invention. An audiovisual track may include a video clip of a musical performance such as a performance of a musical instrument, a vocal performance, and/or other video clips of various other types of performances (e.g., dance performances, comedy performances, etc.), and/or video clips of various types of sound. An audiovisual track may include audio information, video information, and/or other information (e.g., metronome information, still image information, etc.) that facilitates presentation of the performance associated with the audiovisual track to a user. The audiovisual track may be stored within one or more electronic files.

System 100 may include a computer 110, media sharing services 140, client devices 150, and/or other components. In some embodiments, computer 110 may include one or more processors 120 configured to perform some or all of a functionality of a plurality of modules, which may be stored in a memory 121. For example, the one or more processors 120 may be configured to execute a project creation module 111, a tracking recording module 112, a synchronization module 113, a mixer module 114, a communication module 115, a user interface module 116, and/or other modules 119.

Project creation module 111 may be configured to obtain a project by creating a new project and/or retrieving an existing project from a media library 132. A project may include one or more audiovisual tracks that may be combined together to generate a mix. For example, a project may be a particular song, and audiovisual tracks of the project may include a video clip of a performer's playing the keyboard, playing the drum, singing the song, etc. In some embodiments, a project and/or a resulting mix may include a single audiovisual track. Media library 132 may include a local repository and/or an online repository (e.g., a cloud-based data repository).

Project creation module 111 may obtain project attributes related to the project such as the name of the project (e.g., song title), the name of the project creator (e.g., artist name), notes, date and time that the project was created and/or modified, metronome properties, project time duration, relative start and end times of audiovisual tracks that are included in the project, pitch (e.g., "C"), key (e.g., "major" or "minor"), and/or one or more identifications of the audiovisual tracks. The project attributes are associated with a unique project identification ("Project ID") assigned for the particular project. The project attributes may be automatically generated by computer 110 and/or determined based on user input. For example, a user may specify the name of the project and the name of the project creator and/or provide notes when a project is created and/or updated.

In addition, project creation module 111 may be configured to obtain track attributes related to individual audiovisual tracks included in the project such as the name of the track (e.g., "drum," "keyboard," and/or other track titles), the name of the track creator (e.g., performer name), notes, date and time that the track was created, recorded, and/or modified, metronome properties, track time duration, pitch, key, and/or one or more identifications of "DJ Mix" records ("DJ Mix Record IDs"). The track attributes are associated with a unique track identification ("Track ID") assigned for the particular track where each Track ID may be associated with one or more Project IDs of particular projects to which the track belongs. The track attributes may be automatically generated by computer 110 and/or determined based on user input. For example, a user may specify the name of the track and the name of the track creator and/or provide notes when an audiovisual track is created and/or updated.

In some embodiments, project creation module 111 may be configured to create a new project. Project creation module 111 may create the new project according to one or more project attributes (e.g., the name of the project, the name of the project creator, etc.) received from a user. In some embodiments, project creation module 111 may be configured to retrieve an existing project from media library 132. Media library 132 may include projects created by and/or audiovisual tracks recorded by various users. A user may specify access control preferences (e.g., privacy preferences) for the projects and/or audiovisual tracks associated with the user in media library 132. For example, a user may freely select and import existing projects and/or audiovisual tracks associated with the user. On the other hand, permission may be required to access another user's projects and/or audiovisual tracks depending on the access control preferences. The access control preferences associated with individual users may be stored in a user profile 134.

Project creation module 111 may be configured to add audiovisual tracks to the new project and/or existing project by recording new tracks and/or importing existing tracks from media library 132. Project creation module 111 may determine whether to import a particular existing audiovisual track that a user selects based on the access control preference stored in user profile 134. Furthermore, audiovisual tracks available in various media sharing services 140 such as YouTube, Hulu, etc. may also be imported and added to the project.

Project creation module 111 may be configured to search for a particular existing project and/or a particular existing track to add and/or import from media library 132 and/or media sharing services 140 using any one of the project attributes and/or track attributes discussed herein. For example, a user may be looking for a solo part that is made in a particular key (e.g., "major" or "minor"). In this case, the user may search within media library 132 and/or media sharing services 140 for audiovisual tracks made in that particular key.

Track recording module 112 may be configured to create a new audiovisual track by recording an audiovisual input from an audiovisual capture device. Track recording module 112 may receive an audiovisual input such as a performer's playing a musical instrument via the audiovisual capture device. A client device (e.g., a client device 150A) may comprise the audiovisual capture device which may be used to capture and transmit audio data and/or video images via a microphone and/or a video camera or webcam. Track recording module 112 may switch the video camera (or webcam) on and off and/or may adjust the direction of the camera based on user input. Similarly, the microphone may be muted and/or the volume of the microphone may be adjusted.

In some embodiments, track recording module 112 may be configured to create a new audiovisual track to be added to a project by simultaneously recording an audiovisual input while other existing tracks of the project are being played. In these embodiments, a user may select one or more existing tracks currently included in the project to be played. A user may also select the entire tracks of the project to be played at the same time. The user may then record a new audiovisual track in real-time while the selected tracks are being played. In this way, track recording module 112 may layer a new audiovisual track over other existing audiovisual tracks in real-time. This may allow a user to perform a musical instrument, for example, while listening to and watching visual performance of other parts of the song to help simulate a live jam session as closely as possible.

In some embodiments, track recording module 112 may start recording an audiovisual input from the beginning of an existing track being played back. In this way, the start time of the new audiovisual track being created may be the same as the start time of the existing track. In other embodiments, track recording module 112 may add a new track at a certain point in time in the middle of a particular existing track being played back. This technique may be useful, for example, when a user wants to insert a solo part (e.g., guitar solo) in the middle of a song. Track recording module 112 may receive an indication of a particular point in time to start recording a new track. For example, a user may select a seek operation where a user specifies a specific playback time to seek to, or jump to, within the track being played back. If the existing track being played back has a track time duration of 3:35 minutes, a user may specify a specific time point (e.g., 1:24 minute) from which the user wants to start recording a new track. A user may use a slider bar to indicate this specific time point. In another example, the user may play the existing track and simply wait until it reaches a specific time point. Once that time point has been reached, the user may start recording a new track from that point.

Track recording module 112 may be configured to store the new audiovisual track recorded in media library 132. The association between the new audiovisual track and the project in which the new audiovisual track is created may also be stored in media library 132.

Synchronization module 113 may be configured to synchronize a plurality of audiovisual tracks in a project. In order to generate a synchronized mix of the plurality of audiovisual tracks, synchronization module 113 may specify or otherwise update one or more track attributes and/or project attributes including metronome properties (as related to a particular audiovisual track and/or the project), project time duration, relative start and end times of audiovisual tracks that are included in the project, pitch, key, and/or one or more identifications of the audiovisual tracks based on tracks being added to and/or deleted from the project.

Because many people use a metronome to set a tempo while performing a musical instrument or singing a song, synchronization module 113 may use the metronome as a way to synchronize the plurality of audiovisual tracks in the project. A metronome may produce a series of audibly repetitive sounds at a certain tempo, which may be measured in beats per minute ("BPM"). In some embodiments, synchronization module 113 may be configured to specify or otherwise update metronome properties including whether a metronome is enabled or disabled for the track, a metronome clock rate (e.g., BPM), and/or the volume and sound of the metronome. For example, when the project has been newly created and a user records a first track for the project, the user may specify metronome properties for the first track via synchronization module 113. In this way, the user may record the first track at a tempo set by the metronome properties. In another example, if the user chooses to import a first track from media library 132 or media sharing services 140, synchronization module 113 may identify metronome properties, if any, that are associated with the imported track.

The metronome properties specified and/or identified for the first track may then be associated with the project in which the first track belongs to and used to synchronize the first track with other tracks later added to the same project.

In some embodiments, when recording a second track in the project, synchronization module 113 may be configured to determine whether the metronome is enabled or disabled based on the metronome properties associated with the project before starting to record the second track. For example, if it is determined that the metronome is enabled for the project, synchronization module 113 may identify other metronome properties (e.g., metronome clock rate, the volume and sound of the metronome, etc.) related to the project and turn on the metronome as defined by the metronome properties while recording the second track. In this example, a user may hear the metronome at the identified clock rate in the background while recording the second track such that the timing and tempo of the plurality of audiovisual tracks in the project may be synchronized. In another example, if it is determined that the metronome was turned off for the project, the metronome may not be turned on for the second track and/or any additional tracks that may be added to the project thereafter. In other words, synchronization module 113 may disable the metronome in such a case for that project.

In some embodiments, when importing a second track from media library 132 or media sharing services 140, synchronization module 113 may be configured to determine whether the metronome clock rate associated with the project is the same as or different from a metronome clock rate associated with the second track. If the metronome clock rates are determined to be the same, the second track may be imported to the project without any modification to the second track. On the other hand, there may be a situation where these metronome clock rates are different. For example, where a project has a metronome clock rate of 120 BPM associated with it, a user may want to import a second track having a 100 BPM drum beat to the project. In this case, synchronization module 113 may adjust the tempo of the second track by increasing the tempo from 100 BPM to 120 BPM in order to synchronize the second track with the rest of audiovisual tracks included in the project.

Synchronization module 113 may be configured to edit and/or modify metronome properties after one or more audiovisual tracks have been added to the project by recording new tracks and/or importing existing tracks. For example, a user may adjust a metronome clock rate for the project, and all of the audiovisual track included in this project may be increased or decreased in tempo to match with the adjusted clock rate.

In some embodiments, synchronization module 113 may be configured to specify or otherwise update a pitch and/or key in such a manner that the resulting mix has a harmonious sound. For example, when a project has been newly created and a user records a first track for the project, the user may specify a pitch and/or key to be used for the first track. The pitch and/or key information may be automatically determined by synchronization module 113 by analyzing the audio data (e.g., sound) of the first track. In another example, if the user chooses to import a first track from media library 132 or media sharing services 140, synchronization module 113 may identify a pitch and/or key, if any, that is associated with the imported track.

The key and/or pitch information specified and/or identified for the first track may then be associated with the project in which the first track belongs to and used to synchronize (and/or harmonize) the first track with other tracks later added to the same project.

In some embodiments, when adding a second track to the project by recording a second track and/or importing it from media library 132 or media sharing services 140, a synchronization module 113 may be configured to determine whether the key and/or pitch associated with the project is the same as or different from a key and/or pitch associated with the second track. For example, where a project has a key and pitch pair such as "C major" associated with it, a user may have recorded a second track in a different key and pitch pair such as "D minor" or the user may want import a second track that is made in "D minor." In this case, synchronization module 113 may adjust the key or pitch (or both) of the second track to match with the ones associated with the project in order to produce a synchronized mix that sounds harmonious and pleasing to the human ear.

Whenever an additional track is added to a particular project by recording new tracks and/or importing existing tracks, synchronization module 113 may be configured to specify or otherwise update relative start and end times of the audiovisual tracks in order to ensure that the tracks can be successfully combined as one synchronized mix. An additional track (e.g., a new track being recorded and/or an existing track being imported) may be added at the beginning of another track in the project or at a certain point in time in the middle of the track. This technique may be useful, for example, when a user wants to insert a solo part (e.g., guitar solo) in the middle of a song. For example, when a second track is layered over a first track such that the second track begins at the same time as the first track, the start times for both of the first and second tracks may be equally denoted by 00:00. The end times may be different if the time durations of the tracks are different. In another example, if the second track begins at a certain point in time (e.g., 01:30) in the middle of the first track, the first track may have a start time of 00:00 whereas the second track has a start time of 01:30.

Furthermore, based on the relative start and end times of individual audiovisual tracks included in the project, synchronization module 113 may be configured to specify or otherwise update the project time duration for that particular project. The project time duration may indicate a total length of time from the start time of the earliest track (e.g., 00:00) to the end time of the latest track. For example, synchronization module 113 may compare the relative end times associated with individual tracks included in the project with one another and/or identify the latest end time. In this example, the latest end time may be used to specify or otherwise update the project time duration for the project.

Mixer module 114 may be configured to activate a "DJ Mix" mode and/or simultaneously record the changes and/or modifications made to "DJ Mix" settings associated with individual audiovisual tracks in a project while the project (e.g., the entire collection of audiovisual tracks included in the project) is being played back (where the project may include a single or multiple audiovisual tracks). In other words, while the project is being played back, mixer module 114 may record a user's DJ actions that change and/or modify sequencing and/or characteristics related to one or more audiovisual tracks included in the project.

In the "DJ Mix" mode, a user may specify or otherwise update one or more "DJ Mix" settings while playing the project. "DJ Mix" settings may include deleting of a track, looping a part of a track, changing the volume of a track, muting the volume, hiding a track, changing the tempo of a track, changing the pitch/key of a track and/or changing the position of a track on a screen. An individual track may be associated with one or more "DJ Mix" records where each "DJ Mix" record may comprise information related to a particular "DJ Mix" setting.

For example, a "DJ Mix" record associated a particular track may include a default value of 7 for the volume. If a user changes the volume for this track via mixer module 114 while the project is being played back, the "DJ Mix" record may be updated to include the new value for the volume and a point in time at which the volume was changed. The point in time may be represented as a length of time relative to the total time duration for the project (e.g., project time duration). In another example, a "DJ Mix" record associated with a particular track may include information related to looping. Where the default value is "not looped," a user may change this setting by selecting to loop a part of the track during the playback of the project. In this example, the "DJ Mix" record may be updated to include the changed value such as "looped" and a point in time (relative to the project time duration) at which the change has occurred. If this setting is changed again to stop the looping at a later time during the playback of the project, the "DJ Mix" record may include another changed value (e.g., "not looped") along with a point in time at which the looping has ended.

Mixer module 113 may be configured to generate a synchronized mix of one or more audiovisual tracks included in a project based on the selected options and/or changes for the "DJ Mix" settings that have been simultaneously recorded during the playback of the project. For example, if a user in the "DJ Mix" mode hides a particular track at 01:28 (e.g., a point in time relative to the project time duration) and later un-hide (e.g., undo the hide function) the track at 01:55 during the playback of a project, mixer module 113 may record the user's DJ actions in real-time and generate a synchronized mix which may reflect these actions. In this example, when this synchronized mix gets played, that particular track may disappear from the screen at 01:28 and re-appear on the screen at 01:55.

In some embodiments, mixer module 113 may be configured to change and/or modify "DJ Mix" settings associated with individual audiovisual tracks in a project in non-real-time. For example, without having to play the project and simultaneously record the changes, a user may simply select a particular track and "mute" it for the entire duration of a project or a particular subset of the duration of the project. Mixer module 113 may also be configured to generate a synchronized mix of one or more audiovisual tracks included in a project based on the selected options and/or changes for the "DJ Mix" settings that have been made in non-real-time.

Mixer module 113 may be configured to store a synchronized mix as a new project in media library 132 and/or replace the current project from which the mix was generated with the synchronized mix in media library 132.

Mixer module 113 may be configured to generate an audio file (e.g., MP3) of a synchronized mix.

In some embodiments, communication module 115 may be configured to communicate a synchronized mix via a user interface such that a user may listen and view the mix being played. In some embodiments, communication module 115 may enable live playback of the mix while an audiovisual input is being recorded. For example, a user may listen and view the mix being played as the user records a musical performance. In this way, the user may simulate the experience and excitement of a live jam session. In some embodiments, communication module 115 may be configured to share and/or publish a synchronized mix via media sharing services 140 (e.g., YouTube, Hulu, etc.), social media providers (e.g., Facebook, Twitter, Tumblr, etc.), email, and/or other communication channels.

In some embodiments, user interface module 116 may be configured to generate user interfaces that allow interaction with projects and audiovisual tracks. For example, the user interface module may present various displays for creating projects, recording audiovisual tracks, synchronizing the tracks, and/or mixing the tracks.

Those having skill in the art will recognize that computer 110 and client device 150 may each comprise one or more processors, one or more interfaces (to various peripheral devices or components), memory, one or more storage devices, and/or other components coupled via a bus. The memory may comprise random access memory (RAM), read only memory (ROM), or other memory. The memory may store computer-executable instructions to be executed by the processor as well as data that may be manipulated by the processor. The storage devices may comprise floppy disks, hard disks, optical disks, tapes, or other storage devices for storing computer-executable instructions and/or data.

One or more applications, including various modules, may be loaded into memory and run on an operating system of computer 110 and/or client device 150. In one implementation, computer 110 and client device 150 may each comprise a server device, a desktop computer, a laptop, a cell phone, a smart phone, a Personal Digital Assistant, a pocket PC, or other device.

Network 102 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Figure 2:
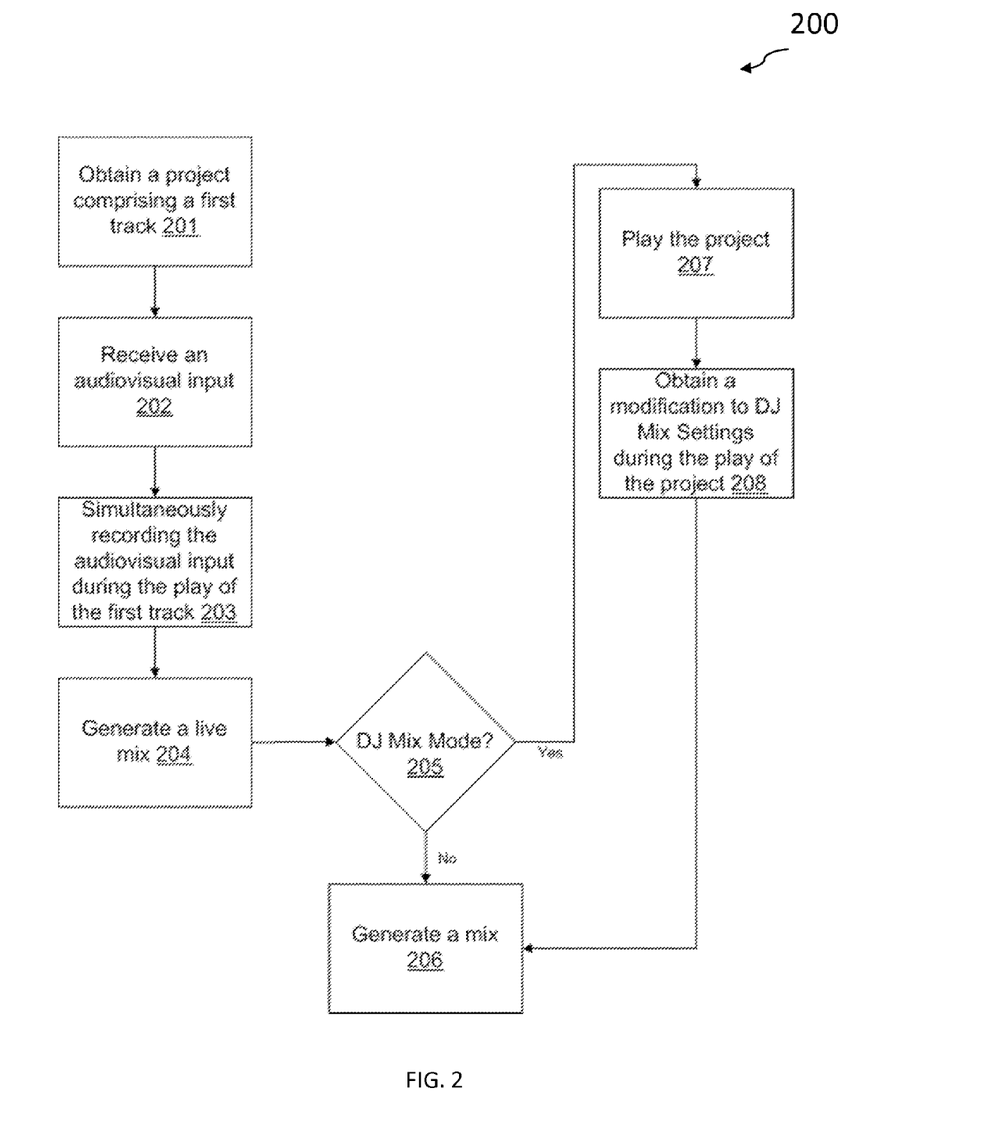
FIG. 2 illustrates a process of generating a synchronized mix of audiovisual tracks, according to an aspect of the invention.

FIG. 2 illustrates a process 200 of generating a synchronized mix of audiovisual tracks, according to an aspect of the invention. The various processing operations and/or data flows depicted in FIG. 2 (and in the other drawing figures) are described in greater detail herein. The described operations may be accomplished using some or all of the system components described in detail above and, in some embodiments, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 201, process 200 may include obtaining a project by creating a new project and/or retrieving an existing project from media library 132. The project may include a first audiovisual track where the first audiovisual track may be newly recorded in the project and/or imported from media library 132 and/or other media sharing services 140.

In an operation 202, process 200 may include receiving an audiovisual input from an audiovisual capture device.

In an operation 203, process 200 may include adding a second audiovisual track to the project by simultaneously recording the audiovisual input received in operation 202 while other existing tracks of the project are being played.

In an operation 204, process 200 may include generating a live mix of the first and second audiovisual tracks and/or communicating the live mix via a user interface while the audiovisual input is being recorded. For example, a user may listen and view how the first and second tracks are combined together into a live mix as the user records the second track within the mix.

In an operation 205, process 200 may include determining whether a "DJ Mix" mode is activated or not. In the "DJ Mix" mode, a user may specify or otherwise update one or more "DJ Mix" settings while playing the project. If process 200 determines that the "DJ Mix" mode has not been activated, process 200 may proceed to an operation 206. In operation 206, process 200 may include generating a mix of the first and second tracks based on default values related to the "DJ Mix" settings. On the other hand if process 200 determines that the "DJ Mix" mode is activated, process 200 may proceed to an operation 207.

In operation 207, process 200 may include playing the project including the first and second audiovisual tracks.

In an operation 208, process 200 may include obtaining a modification that has been made to one or more "DJ Mix" settings while playing the project. Process 200 may return to operation 206 where a mix of the first and second tracks is generated based on changed settings and values related to the one or more "DJ Mix" settings.

Figure 3:
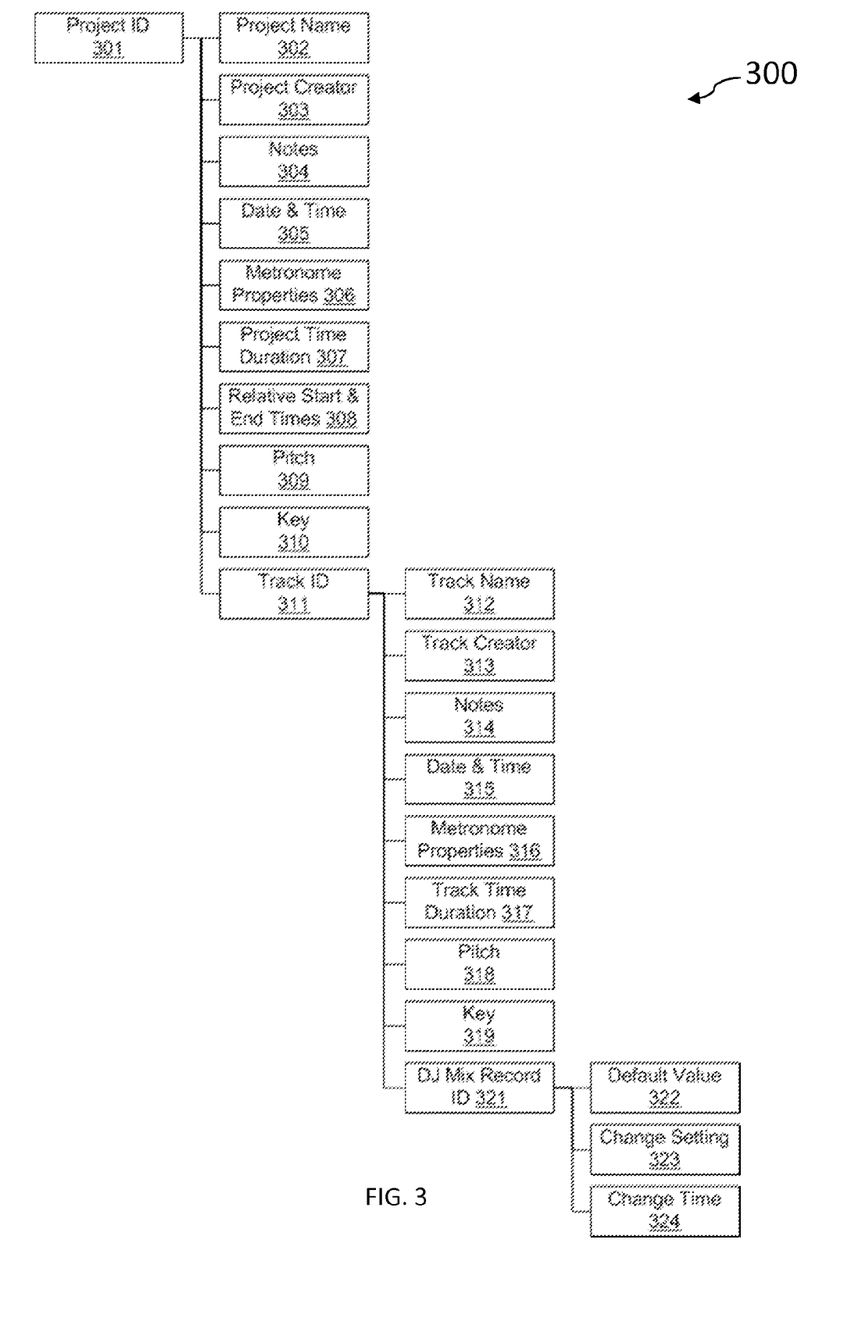
FIG. 3 illustrates a data structure for a project comprising audiovisual tracks, according to an aspect of the invention.

FIG. 3 illustrates a data structure 300 for a project comprising audiovisual tracks, according to an aspect of the invention. Data structure 300 may include a Project ID 301 which may be associated with project attributes. The project attributes may include a Project Name 302 (e.g., song title), a Project Creator 303 (e.g., artist name), a Notes 304, a Date & Time 305 (e.g., date and time that the project was created and/or modified), a Metronome Properties 306, a Project Time Duration 307, a Relative Start and End times 308 (e.g., relative start and end times of audiovisual tracks that are included in the project), a Pitch 309, a Key 310, and/or one or more Track IDs 311 (e.g., one or more identifications of the audiovisual tracks included in the project). A Track ID 311 related to individual audiovisual tracks included in the project may be associated with track attributes. The track attributes may include a Track Name 312 (e.g., "drum," "keyboard," and/or other track titles), a Track Creator 313 (e.g., performer name), a Notes 314, a Date & Time 315 (e.g., date and time that the track was created, recorded, and/or modified), a Metronome Properties 316, a Track Time Duration 317, a Pitch 318, a Key 319, and/or one or more DJ Mix Record IDs 321 (e.g., one or more identifications of "DJ Mix" records). An individual track may be associated with one or more "DJ Mix" records where each "DJ Mix" record may comprise information related to a particular "DJ Mix" setting. Each DJ Mix Record ID 321 is associated with a Default Value 322, a Change Setting 323, and/or a Change Time 324. For example, a DJ MIX Record ID 321 associated a particular Track ID 311 may include a Default Value 322 of 7 for the volume setting. If a user changes the volume for this track, the new value for the volume setting may be included in the Change Setting 323 and a point in time at which the volume was changed may be included in the Change Time 324.

Figure 4:
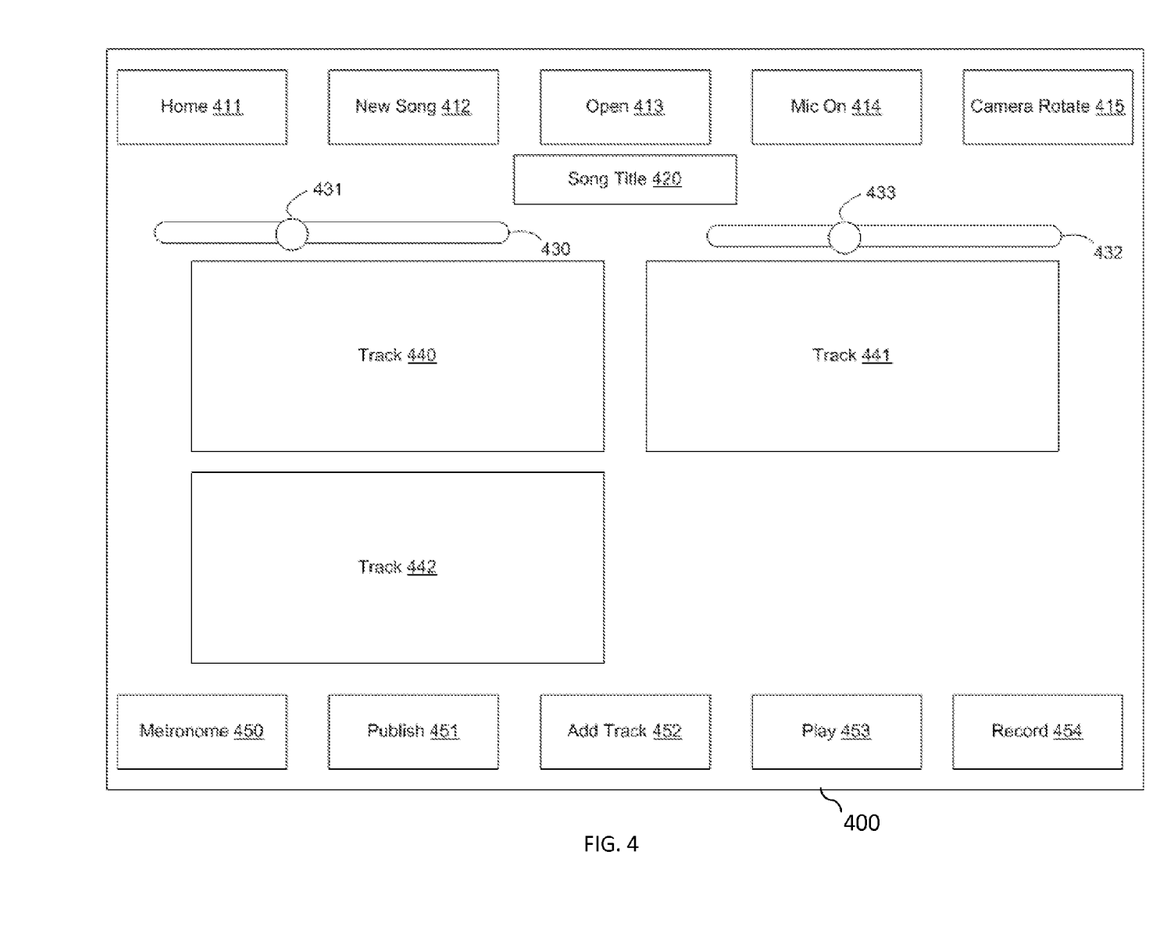
FIG. 4 illustrates a screenshot of an interface for recording a new audiovisual track, according to an aspect of the invention.

FIG. 4 illustrates a screenshot of an interface 400 for recording a new audiovisual track, according to an aspect of the invention. The screenshots illustrated in FIG. 4 and other drawing figures are for illustrative purposes only. Various components may be added, deleted, moved, or otherwise changed so that the configuration, appearance, and/or content of the screenshots may be different than as illustrated in the figures. Accordingly, the graphical user interface objects as illustrated (and described in greater detail below) are exemplary by nature and, as such, should not be viewed as limiting.

Referring to FIG. 4, interface 400 may include a home element 411 that when selected may return to a home page. In the home page (not illustrated), a user may create a new project, and/or open, import, and/or retrieve from media library 132 and/or media sharing services 140 an existing project and/or audiovisual tracks therein. Via this home page, a user may watch synchronized mixes that have been shared and/or published by other users.

Interface 400 may include a new song element 412 which may be used to create a new project. A user may open, import, and/or retrieve from media library 132 and/or media sharing services 140 an existing project and/or audiovisual tracks therein via an open element 413. Interface 400 may include a microphone on/off element 414 which may be used to switch the microphone on and off for recording an audiovisual track. A camera rotate element 415 may selected to switch between front and back cameras.

A project name (e.g., a song title) may be displayed in a song title 420 field. Interface 400 may include a project time duration slider bar 430 and a volume slider bar 432. A widget 431 may be moved along the project time duration slider bar 430 to specify a specific playback time to seek to, or jump to, within the project. For example, a user may specify a specific point in time from which the user wants to start recording a new track by using the widget 431 and the project time duration slider bar 430. In this example, after specifying a specific time point using the widget 431, a user may start recording a new track by selecting a record element 454. A widget 433 that moves along the volume slider bar 432 may be used to adjust the volume of the project.

Interface 400 may include a display box for a video clip of an audiovisual track (e.g., display boxes 440-442). When a user selects a play element 453, the tracks associated with the song title 420 may be played and their corresponding video clips may be displayed via display boxes 440-442.

Interface 400 may include a metronome element 450 which may be selected to specify one or more metronome properties associated with the song title 420. Interface 400 may include a publish element 451 to enable sharing and/or publishing the song via media sharing services 140 (e.g., YouTube, Hulu, etc.), social media providers (e.g., Facebook, Twitter, Tumblr, etc.), email, and/or other communication channels.

Interface 400 may include an add track element 452 to import and/or retrieve an existing audiovisual track from media library 132 and/or other media sharing devices 140.

Figure 5:
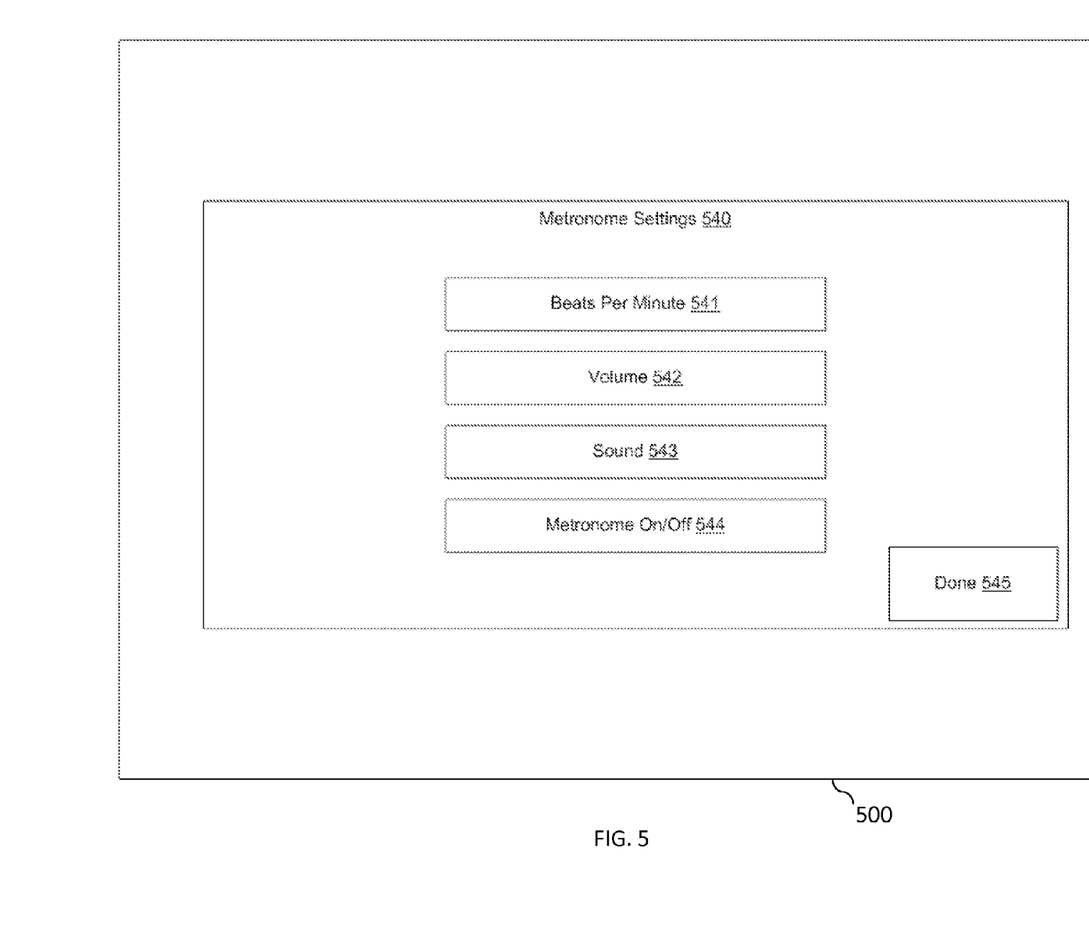
FIG. 5 illustrates a screenshot of an interface for specifying metronome properties, according to an aspect of the invention.

FIG. 5 illustrates a screenshot of an interface 500 for specifying metronome properties, according to an aspect of the invention. Interface 500 may include metronome settings menu 540 which may be used to specify one or more metronome properties. A user may adjust a metronome clock rate by increasing or decreasing a beats per minute via a beats per minute input element 541. Metronome Settings menu 540 may include a volume input element 542 and a sound input element 543. A user may enable and/or disable a metronome by switching it on and off using a metronome on/off input element 544. A user may confirm the changes in the metronome settings by selecting a done element 545.

Figure 6:
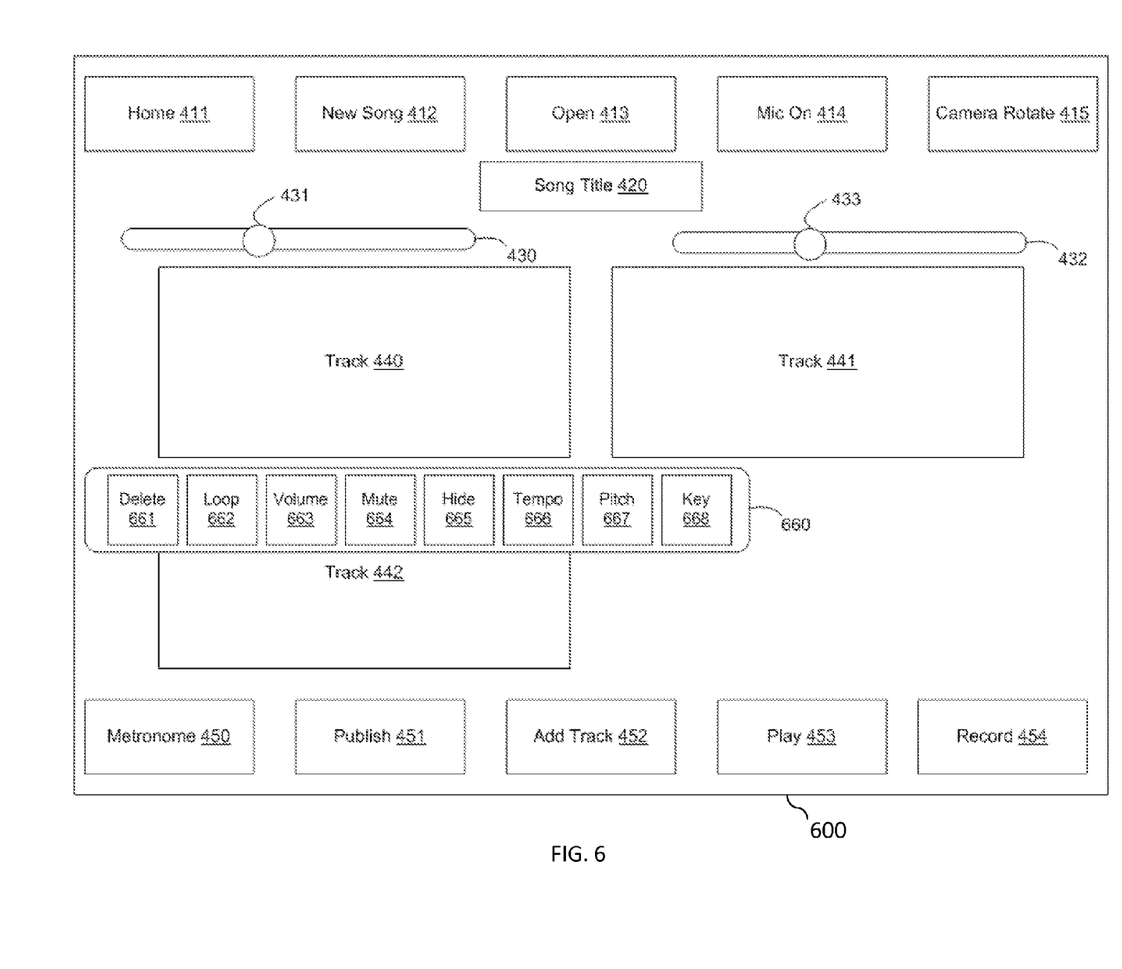
FIG. 6 illustrates a screenshot of an interface for specifying "DJ Mix" settings in a "DJ Mix" mode, according to an aspect of the invention.

FIG. 6 illustrates a screenshot of an interface 600 for specifying "DJ Mix" settings, according to an aspect of the invention. As illustrated, interface 600 may include a DJ Mix menu bar 660 which may appear near each individual display box for displaying a video clip of a corresponding audiovisual track. A user may play the song and its associated tracks by selecting play element 453. While the song is being played, a user may specify one or more "DJ Mix" settings using DJ Mix setting elements 661-665 displayed in the DJ Mix menu bar 660. For example, a delete element 661 may be selected to delete the track from the song, a loop element 662 may be selected to loop a part of the track, a volume element 663 may be selected to change and/or adjust the volume of the track, a mute element 664 may be selected to mute and/or unmute the volume. DJ Mix menu bar 660 may also include a hide element 665 which may be used to hide and/or unhide the track from display interface 600. A tempo element 666 may be selected to adjust and/or change the tempo of the track. A pitch element 667 may be used to adjust and/or change the pitch of the track. Similarly, a key element 668 may be selected to adjust and/or change the key of the track.

Although not illustrated, a display box of a particular track may be moved to a different position on display interface 600 by dragging the particular display box to a different location, for example.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method for generating a synchronized mix of a plurality of audiovisual tracks, the method being implemented in a computer that includes one or more processors configured to execute one or more computer program modules, the method comprising:

obtaining, by a project creation module, a project, the project comprising a first audiovisual track, wherein the project is associated with one or more project attributes;

receiving, by a track recording module, an audiovisual input from an audiovisual capture device;

creating, by the track recording module, a second audiovisual track which comprises the audiovisual input by simultaneously recording the audiovisual input while the first audiovisual track is being played, wherein the first and second audiovisual tracks are associated with one or more track attributes;

generating, by a mixer module, a mix of the first and second audiovisual tracks based on the one or more track attributes or the one or more project attributes; and communicating, by a communication module, the mix via a user interface while the audiovisual input is being recorded.

2. The method of claim 1, the method further comprising:

playing, by the mixer module, the first and second audiovisual tracks of the project;

obtaining, by the mixer module, a modification to be applied to the one or more track attributes or the one or more project attributes during the playing of the first and second audiovisual tracks; and generating, by the mixer module, a mix of the first and second audiovisual tracks based on the modification.

3. The method of claim 1, wherein obtaining the project further comprising:

creating, by the project creation module, a new project;

creating, by the project creation module, the first audiovisual track by recording an audiovisual input received from the audiovisual capture device; and adding, by the project creation module, the first audiovisual track to the new project.

4. The method of claim 1, wherein obtaining the project further comprising:

creating, by the project creation module, a new project;

retrieving, by the project creation module, the first audiovisual track from a media library; and adding, by the project creation module, the first audiovisual track to the new project.

5. The method of claim 1, wherein obtaining the project further comprising:

retrieving, by the project creation module, an existing project, the existing project comprising the first audiovisual track.

6. The method of claim 1, wherein the one or more project attributes include relative start times and end times of each of the first and second audiovisual tracks.

7. The method of claim 1, wherein the one or more project attributes include information related to a metronome clock rate, pitch, or key.

8. The method of claim 1, wherein the one or more track attributes include information related to a metronome clock rate, pitch, key, volume, muteness, loop, or a position of the video of each of the first and second audiovisual tracks on a screen.

9. The method of claim 7, wherein creating the second audiovisual track to be added to the project further comprising:

recording, by the track recording module, the second audiovisual track based on the metronome clock rate.

10. The method of claim 7, the method further comprising:

determining, by a synchronization module, that the metronome clock rate associated with the project is different from a metronome clock rate associated with the first audiovisual track; and adjusting, by the synchronization module, a tempo of the first audiovisual track based on the metronome clock rate associated with the project.

11. The system of claim 7, the method further comprising:
  determining, by a synchronization module, that the pitch or key associated with the project is different from a pitch or key associated with the first audiovisual track; and
  adjusting, by the synchronization module, the pitch or key associated with the first audiovisual track based on the pitch or key associated with the project.

12. A system for generating a synchronized mix of a plurality of audiovisual tracks, the system comprising:
  one or more processors configured to execute computer program modules, the computer program modules comprising:
    a project creation module configured to:
      obtain a project, the project comprising a first audiovisual track, wherein the project is associated with one or more project attributes;
    a track recording module configured to:
      receive an audiovisual input from an audiovisual capture device;
      create a second audiovisual track which comprises the audiovisual input by simultaneously recording the audiovisual input while the first audiovisual track is being played, wherein the first and second audiovisual tracks are associated with one or more track attributes;
    a mixer module configured to:
      generate a mix of the first and second audiovisual tracks based on the one or more track attributes or the one or more project attributes; and
    a communication module configured to:
      communicate the mix via a user interface while the audiovisual input is being recorded.

13. The system of claim 12, wherein the mixer module is further configured to:
  play the first and second audiovisual tracks of the project;
  obtain a modification to be applied to the one or more track attributes or the one or more project attributes during the playing of the first and second audiovisual tracks; and
  generate a mix of the first and second audiovisual tracks based on the modification.

14. The system of claim 12, wherein the project creation module is further configured to:
  create a new project;
  create the first audiovisual track by recording an audiovisual input received from the audiovisual capture device; and
  add the first audiovisual track to the new project.

15. The system of claim 12, wherein the project creation module is further configured to:
  create a new project;
  retrieve the first audiovisual track from a media library; and
  add the first audiovisual track to the new project.

16. The system of claim 12, wherein the project creation module is further configured to:
  retrieve an existing project, the existing project comprising the first audiovisual track.

17. The system of claim 12, where the one or more project attributes include relative start times and end times of each of the first and second audiovisual tracks.

18. The system of claim 12, wherein the one or more project attributes include information related to a metronome clock rate, pitch, or key.

19. The system of claim 12, wherein the one or more track attributes include information related to a metronome clock rate, pitch, key, volume, muteness, loop, or a position of the video of each of the first and second audiovisual tracks on a screen.

20. The system of claim 18, wherein the track recording module is further configured to:
  record the second audiovisual track based on the metronome clock rate.

21. The system of claim 18, the computer program modules further comprising:
  a synchronization module configured to:
    determine that the metronome clock rate associated with the project is different from a metronome clock rate associated with the first audiovisual track; and
    adjust a tempo of the first audiovisual track based on the metronome clock rate associated with the project.

22. The system of claim 18, the computer program modules further comprising:
  a synchronization module configured to:
    determine that the pitch or key associated with the project is different from a pitch or key associated with the first audiovisual track; and
    adjust the pitch or key associated with the first audiovisual track based on the pitch or key associated with the project.

* * * * *